US006987730B2

(12) United States Patent
Hata et al.

(10) Patent No.: US 6,987,730 B2
(45) Date of Patent: Jan. 17, 2006

(54) TRANSMISSION APPARATUS AND METHOD FOR CHANGING DATA PACKETS PRIORITY ASSIGNMENT DEPENDING ON THE RECEPTION FEEDBACK

(75) Inventors: Koichi Hata, Katano (JP); Akihiro Miyazaki, Sakai (JP); Koji Imura, Machida (JP); Daiji Ido, Yokohama (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 821 days.

(21) Appl. No.: 09/929,487

(22) Filed: Aug. 15, 2001

(65) Prior Publication Data

US 2002/0021700 A1 Feb. 21, 2002

(30) Foreign Application Priority Data

Aug. 17, 2000 (JP) ..................................... 2000-247328
Dec. 26, 2000 (JP) ..................................... 2000-395183

(51) Int. Cl.
*H04L 12/26* (2006.01)

(52) U.S. Cl. ..................... 370/232; 370/235; 709/232
(58) Field of Classification Search ............... 370/231, 370/234–236, 522; 709/231, 232; 714/748–750
See application file for complete search history.

(56) References Cited

U.S. PATENT DOCUMENTS

| 5,208,805 | A |   | 5/1993  | Ochiai |         |
|-----------|---|---|---------|--------|---------|
| 5,367,523 | A | * | 11/1994 | Chang et al. | 370/235 |
| 5,703,870 | A | * | 12/1997 | Murase | 370/232 |
| 5,729,542 | A |   | 3/1998  | Dupont |         |
| 5,768,533 | A | * | 6/1998  | Ran    | 709/247 |
| 5,920,705 | A |   | 7/1999  | Lyon et al. | |
| 6,081,843 | A | * | 6/2000  | Kilkki et al. | 709/232 |

(Continued)

FOREIGN PATENT DOCUMENTS

| EP | 0756435      | 1/1997  |
|----|--------------|---------|
| EP | 0 905 976 A1 | 3/1999  |
| EP | 1 006 689 A2 | 6/2000  |
| EP | 1 009 138 A2 | 6/2000  |
| EP | 1045563      | 10/2000 |
| JP | 07-336316    | 12/1995 |
| JP | 11-004216    | 1/1999  |
| JP | 2000-228676  | 8/2000  |
| WO | 0041368      | 7/2000  |
| WO | 0225867      | 3/2002  |

OTHER PUBLICATIONS

"RTP: A Transport Protocal for Real–Time Applications", H. Schulzrinne, S. Casner, R. Frederik, and V. Jacobson, RFC 1889, 1996, pp 1–75.

Primary Examiner—Hanh Nguyen
Assistant Examiner—D L Levitan
(74) Attorney, Agent, or Firm—Wenderoth, Lind & Ponack, L.L.P.

(57) ABSTRACT

A data transmitter 10 transmits packets each with a sequence number and a priority added. A data receiver 20 detects any packet loss by referring to the sequence numbers added to the packets, and if detecting any packet of high priority as having been lost, requests for packet retransmission. Based on information about thus detected packet loss, the data receiver 20 generates and transmits an RR packet 110 indicating the packet reception state. The data transmitter 10 extracts from the RR packet 110 a packet loss ratio 200, and therewith, changes manners of priority assignment. The manners are so changed that the packet of high priority is found with a lower ratio when the packet loss ratio 200 is high, and when the packet loss ratio 200 is low, found with a higher ratio.

19 Claims, 9 Drawing Sheets

U.S. PATENT DOCUMENTS

| | | |
|---|---|---|
| 6,091,709 A | 7/2000 | Harrison et al. |
| 6,163,808 A | 12/2000 | Kilkki |
| 6,167,030 A | 12/2000 | Kilkki et al. |
| 6,188,670 B1 | 2/2001 | Lackman et al. |
| 6,222,841 B1 | 4/2001 | Taniguchi |
| 6,247,061 B1 | 6/2001 | Douceur et al. |
| 6,335,933 B1 * | 1/2002 | Mallory ...................... 370/394 |
| 6,426,943 B1 | 7/2002 | Spinney et al. |
| 6,438,135 B1 | 8/2002 | Tzeng |
| 6,442,166 B1 | 8/2002 | McDonald et al. |
| 6,445,679 B1 | 9/2002 | Taniguchi et al. |
| 6,449,251 B1 | 9/2002 | Awadallah et al. |
| 6,449,255 B1 | 9/2002 | Waclawsky |
| 6,563,836 B1 | 5/2003 | Capps et al. |
| 6,584,509 B2 | 6/2003 | Putzolu |
| 6,587,985 B1 * | 7/2003 | Fukushima et al. ......... 714/748 |
| 6,628,610 B1 | 9/2003 | Waclawsky et al. |
| 6,628,614 B2 | 9/2003 | Okuyama et al. |
| 6,643,256 B1 * | 11/2003 | Shimojo et al. ............ 370/229 |
| 6,646,988 B1 | 11/2003 | Nandy et al. |
| 6,654,346 B1 | 11/2003 | Mahalingaiah et al. |
| 6,684,354 B2 * | 1/2004 | Fukushima et al. ......... 714/718 |
| 6,748,435 B1 | 6/2004 | Wang et al. |
| 6,760,309 B1 | 7/2004 | Rochberger et al. |

* cited by examiner

| TYPE OF PRIORITY ASSIGNING PARTS \ PACKET TYPE | INTRA-CODED PACKET | INTER-CODED PACKET |
|---|---|---|
| FIRST PRIORITY ASSIGNING PART | ASSIGN PRIORITY HIGH AND LOW WITH RATIO OF 1:1 | ASSIGN LOW PRIORITY |
| SECOND PRIORITY ASSIGNING PART | ASSIGN HIGH PRIORITY | ASSIGN LOW PRIORITY |
| THIRD PRIORITY ASSIGNING PART | ASSIGN HIGH PRIORITY | ASSIGN HIGH PRIORITY |

| OTHER HEADER DATA | PT | PACKET LENGTH (L) |
|---|---|---|
| RECEPTION-SIDE IDENTIFIER (SSRC_R) |||
| TRANSMISSION-SIDE IDENTIFIER (SSRC) |||
| SECOND SEQUENCE NUMBER (SSN) || OTHER DATA |

| OTHER HEADER DATA | PT | PACKET LENGTH (L) |
|---|---|---|
| RECEPTION-SIDE IDENTIFIER (SSRC_R) |||
| TRANSMISSION-SIDE IDENTIFIER (SSRC) |||
| PACKET LOSS RATIO (FL) | CUMULATIVE NUMBER OF PACKETS LOST (CNPL) ||
| EXTENDED HIGHEST SEQUENCE NUMBER RECEIVED (EHSNR) |||
| INTERARRIVAL JITTER (IJ) |||
| LAST SR (LSR) |||
| DELAY SINCE LAST SR (DLSR) |||

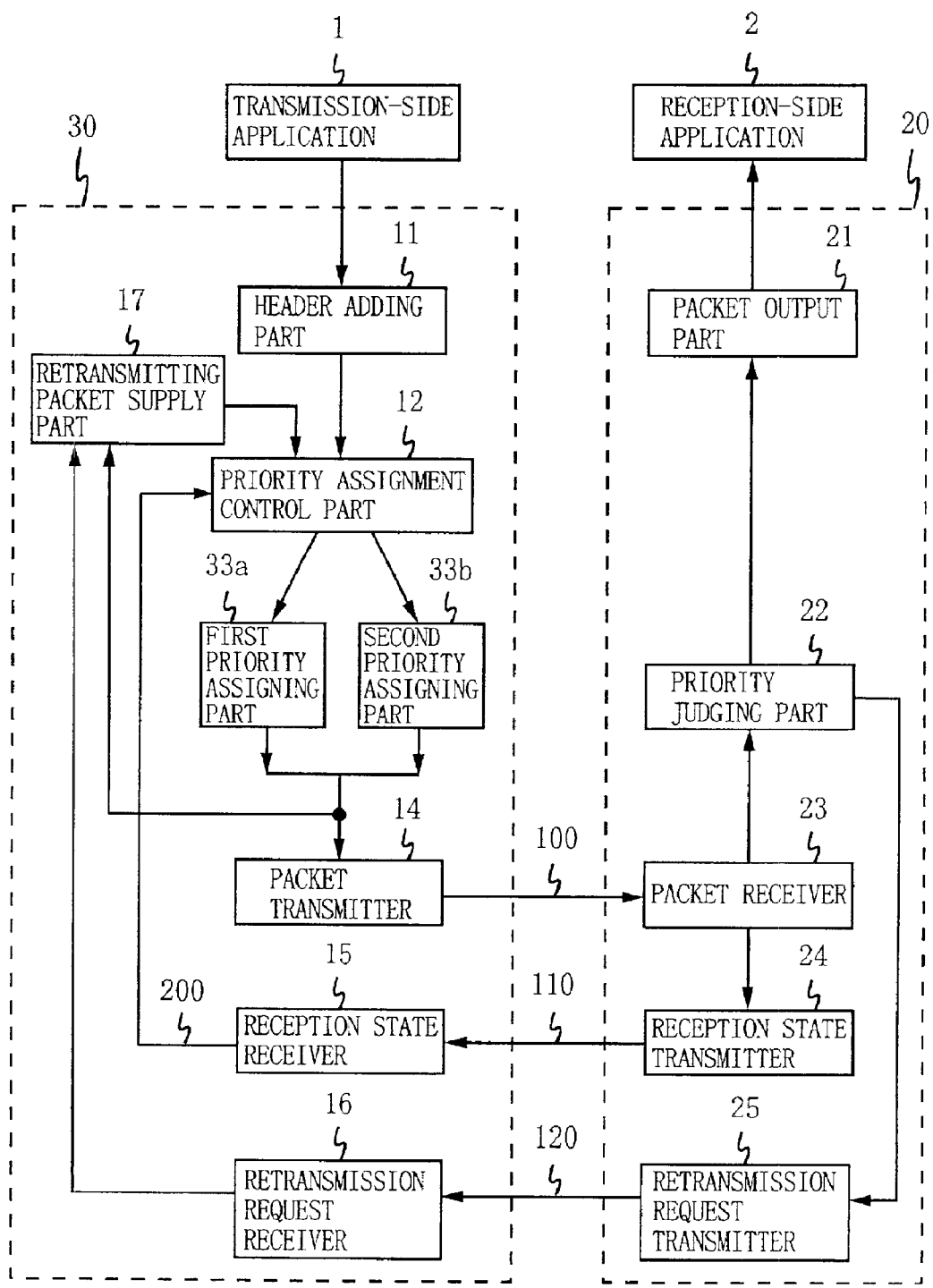
F I G. 7

| TYPE OF PRIORITY ASSIGNING PARTS \ PACKET TYPE | INTRA-CODED PACKET | INTER-CODED PACKET |
|---|---|---|
| FIRST PRIORITY ASSIGNING PART | ASSIGN HIGH PRIORITY | ASSIGN LOW PRIORITY |
| SECOND PRIORITY ASSIGNING PART | ASSIGN HIGH PRIORITY | ASSIGN HIGH PRIORITY |

TRANSMISSION APPARATUS AND METHOD FOR CHANGING DATA PACKETS PRIORITY ASSIGNMENT DEPENDING ON THE RECEPTION FEEDBACK

BACKGROUND OF THE INVENTION

1. Field of the Invention

The present invention relates to apparatuses and methods for data transmission on a packet basis and, more specifically, to a data transmission apparatus and method wherein every packet is assigned with a priority, and only any packet high in priority is to be retransmitted.

2. Description of the Background Art

Data such as video and audio is generally transmitted in real-time under a Realtime Transport Protocol (RTP). The details of the RTP are found in "RTP: A Transport Protocol for Real-Time Applications", H. Schulzrinne, S. Casner, R. Frederik, and V. Jacobson, RFC1889, 1996.

FIG. 9 is a block diagram showing the configuration of a data transmission apparatus having the RTP applied. In FIG. 9, a data transmitter 50 and a data receiver 60 work together to transmit data from a transmission-side application 1 to a reception-side application 2. Herein, the transmission-side application 1 is exemplified by a video encoder and audio encoder, while the reception-side application 2 by a corresponding video decoder and audio decoder.

A header adding part 51 provides a packet outputted from the transmission-side application 1 with a header including a sequence number and a timestamp, for example. A packet transmitter 52 transmits a data packet 101 with such header added. A packet receiver 62 receives and outputs the data packet 101 to a packet output part 61, wherein the data packet is stored. The packet output part 61 outputs the stored data packet to the reception-side application 2 based on the timestamp.

During data transmission over a general transmission path, packet loss is likely to occur due to transmission error and congestion. Under the RTP, the packet receiver 62 refers to the sequence numbers assigned to each of the received data packets 101 to detect if any packet loss has been occurred. How the packet receiver 62 is receiving the data packets (hereinafter, packet reception state) is informed to a reception state transmitter 63. The reception state transmitter 63 then generates a receiver report packet (RR packet) 110, indicating the largest sequence number found among those so far received, and the total number of packets lost so far. Thus generated RR packet 110 is transmitted to a reception state receiver 53, and the reception state found in the RR packet 110 is then notified to both the transmission-side application 1 and the packet transmitter 52.

FIG. 10 is a sequence diagram for data transmission under the RTP. The data transmitter 50 assigns a sequence number (SN) to every packet (denoted by an arrow), and transmits the packets sequentially. The data receiver 60 informs the data transmitter 50 of the packet reception state by transmitting an RR packet with a predetermined timing.

Also known is data transmission under an enhanced RTP (priority-assigned RTP) wherein every packet is assigned with a priority, and only any packet high in priority is to be retransmitted. FIG. 11 is a block diagram showing the configuration of a data transmission apparatus having such priority-assigned RTP applied. A priority assigning part 72 sequentially assigns each header-added packet with a priority of high or low, and a second sequence number. Here, the second sequence number is incremented by 1 whenever the subsequent packet is of high priority, but remains the same if the packet low in priority follows. A packet transmitter 73 transmits a data packet 100 with such priority assigned.

A priority judging part 82 refers to the second sequence numbers to detect whether any packet of high priority has been lost. The detection result is informed to a transmission request transmitter 85. In response, the retransmission request transmitter 85 transmits to a transmission request receiver 75 a negative acknowledge packet (NACK packet) 120 designating which packet needs to be retransmitted. The retransmission request receiver 75 then passes the information to a retransmitting packet supply part 76, wherein the packets of high priority are stored for retransmission. Based on the information, the retransmitting packet supply part 76 responsively outputs any designated packet to the priority assigning part 72. As such, under the priority-assigned RTP, only any packet of high priority is to be processed for retransmission.

FIG. 12 is a sequence diagram for data transmission under the priority-assigned RTP. In FIG. 12, reference characters SN and SSN denote, respectively, the sequence number and the second sequence number. Moreover, "P=1" denotes a packet of high priority, while "P=0" a packet low in priority. In FIG. 12, for example, when packets of SN=3 and SN=4 are both lost, the latter packet is to be retransmitted as is high in priority, but not the former packet of low priority.

Here, in the above, priority assignment is performed with no consideration of the packet reception state, and a ratio between high and low priorities to be assigned is constant. Therefore, no matter if the transmission path is bad in condition and packet loss often occurs, packet retransmission continues, resulting in increase of data for transmission. On the other hand, even if the transmission capacity is ample with the transmission path being good in condition and thus rare packet loss, the packets of high priority are generated yet based on the constant ratio, and packet retransmission is performed only when any packet of high priority is lost. As such, due to the neglect of the packet reception state at the time of priority assignment, data transmission cannot be efficiently carried out with whatever available transmission capacity.

SUMMARY OF THE INVENTION

Therefore, an object of the present invention is to provide a data transmission apparatus and method achieving efficient data transmission with the appropriate manner change of priority assignment in consideration of the packet reception state.

The present invention has the following features to attain the object above.

A first aspect of the present invention is directed to a data transmission apparatus for transmitting data on a packet basis from a transmitter to a receiver. The transmitter comprises: a priority assigning part for assigning priorities on a packet basis; a packet transmission part for transmitting a priority-assigned packet; a reception state receiving part for receiving a packet reception state in the receiver; and a packet retransmitting part for performing packet retransmission in response to a retransmission request from the receiver. The receiver comprises: a packet reception part for receiving the packet provided by the packet transmission part; a reception state transmitting part for transmitting the reception state based on packet loss information detected by the packet reception part; and a retransmission request transmitting part for transmitting the retransmission request if detected any packet of high priority as having been lost. Herein, the priority assignment part changes manners of priority assignment so that the packet of higher priority is decreased in number when the reception state is bad, and increased in number when good.

As described above, in the first aspect, any packet of high priority is generated less when the packet reception state in the receiver is bad, and generated more when the packet reception state is good. As such, by controlling the amount of data to be retransmitted based on the reception state, data transmission can be efficiently carried out with whatever available transmission capacity.

More preferably, the reception state transmission part may transmit the reception state including a packet loss ratio in the packet reception part, and the priority assignment part may change the manners of priority assignment so that the packet of high priority is found with a lower ratio when the packet loss ratio is larger than a predetermined value, and when smaller, the packet of high priority is found with a higher ratio.

According to a second aspect, in the first aspect, the priority assigning part classifies any packet including coded data derived from moving pictures into an intra-coded packet carrying intra-frame coded data, or an inter-coded packet carrying inter-frame coded data, and based on the reception state, changes the manners of priority assignment determined according to packet type.

As described above, in the second aspect, to transmit coded data derived from moving pictures, the packets are classified into two types in consideration of any influence to be exerted upon the resulting reproduced image. Based on the classification and the packet reception state in the receiver, packets are assigned with priorities. As such, by controlling the amount of data to be retransmitted based on the reception state, data transmission can be efficiently carried out with whatever available transmission capacity, preventing quality deterioration to any resulting reproduced image.

In such case, the priority assigning part may change between, based on the reception state, a first priority assigning manner wherein the intra-coded packet is assigned with a high priority, and the inter-coded packet with a low priority, and a second priority assigning manner wherein every packet is assigned with a high priority. Or alternatively, based on the reception state, changed among may be a first priority assigning manner wherein the intra-coded packet is assigned with either a high or low priority at a predetermined ratio and the inter-coded packet with a low priority, a second priority assigning manner wherein the intra-coded packet is assigned with a high priority and the inter-coded packet with a low priority, and a third priority assigning manner wherein every packet is assigned with a high priority.

When coded data derived from moving pictures is transmitted, the packets are classified into two types in consideration of any effect to be exerted upon the resulting reproduced image. In this manner, by changing two or three manners of priority assignment, it becomes possible to prevent quality deterioration to any resulting reproduced image.

A third aspect of the present invention is directed to a data transmission method for transmitting data on a packet basis from a transmitter to a receiver. The transmitter comprises the steps of: assigning priorities on a packet basis; transmitting a priority-assigned packet; receiving a packet reception state in the receiver; and performing packet retransmission in response to a retransmission request from the receiver. The receiver comprises the steps of: receiving the packet provided by the packet transmission part; transmitting the reception state based on packet loss information detected in the packet receiving step; and transmitting the retransmission request if detected any packet of high priority as having been lost. Herein, in the priority assigning step, manners of priority assignment is so changed that the packet of higher priority is decreased in number when the reception state is bad, and increased in number when good.

As described above, in the third aspect, any packet of high priority is generated less when the packet reception state in the receiver is bad, and generated more when the packet reception state is good. As such, by controlling the amount of data to be retransmitted based on the reception state, data transmission can be efficiently carried out with whatever available transmission capacity.

More preferably, in the reception state transmitting step, the reception state including a packet loss ratio in the packet receiving step may be transmitted, and in the priority assigning step, the manners of priority assignment may be so changed that the packet of high priority is found with a lower ratio when the packet loss ratio is larger than a predetermined value, and when smaller, the packet of high priority is found with a higher ratio.

According to a fourth aspect, in the third aspect, in the priority assigning step, any packet including coded data derived from moving pictures is classified into an intra-coded packet carrying intra-frame coded data or an inter-coded packet carrying inter-frame coded data, and based on the reception state, the manners of priority assignment determined according to packet type are changed.

As described above, in the fourth aspect, to transmit coded data derived from moving pictures, the packets are classified into two types in consideration of any influence to be exerted upon the resulting reproduced image. Based on the classification and the packet reception state in the receiver, packets are assigned with priorities. As such, by controlling the amount of data to be retransmitted based on the reception state, data transmission can be efficiently carried out with whatever available transmission capacity, preventing quality deterioration to any resulting reproduced image.

In this case, in the priority assigning step, based on the reception state, changed between may be a first priority assigning manner wherein the intra-coded packet is assigned with a high priority and the inter-coded packet with a low priority, and a second priority assigning manner wherein every packet is assigned with a high priority. Or alternatively, based on the reception state, changed among may be a first priority assigning manner wherein the intra-coded packet is assigned with either a high or low priority at a predetermined ratio and the inter-coded packet with a low priority, a second priority assigning manner wherein the intra-coded packet is assigned with a high priority and the inter-coded packet with a low priority, and a third priority assigning manner wherein every packet is assigned with a high priority.

When coded data derived from moving pictures is transmitted, the packets are classified into two types in consideration of any effect to be exerted upon the resulting reproduced image. In this manner, by changing two or three manners of priority assignment, it becomes possible to prevent quality deterioration to any resulting reproduced image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the format of a NACK packet under the priority-assigned RTP;

FIG. 5 is a diagram showing the format of an RR packet under the priority-assigned RTP;

FIG. 7 is a block diagram exemplarily showing the modified configuration of the data transmission apparatus according to the embodiment of the present invention;

DESCRIPTION OF THE PREFERRED EMBODIMENT

Figure 1:
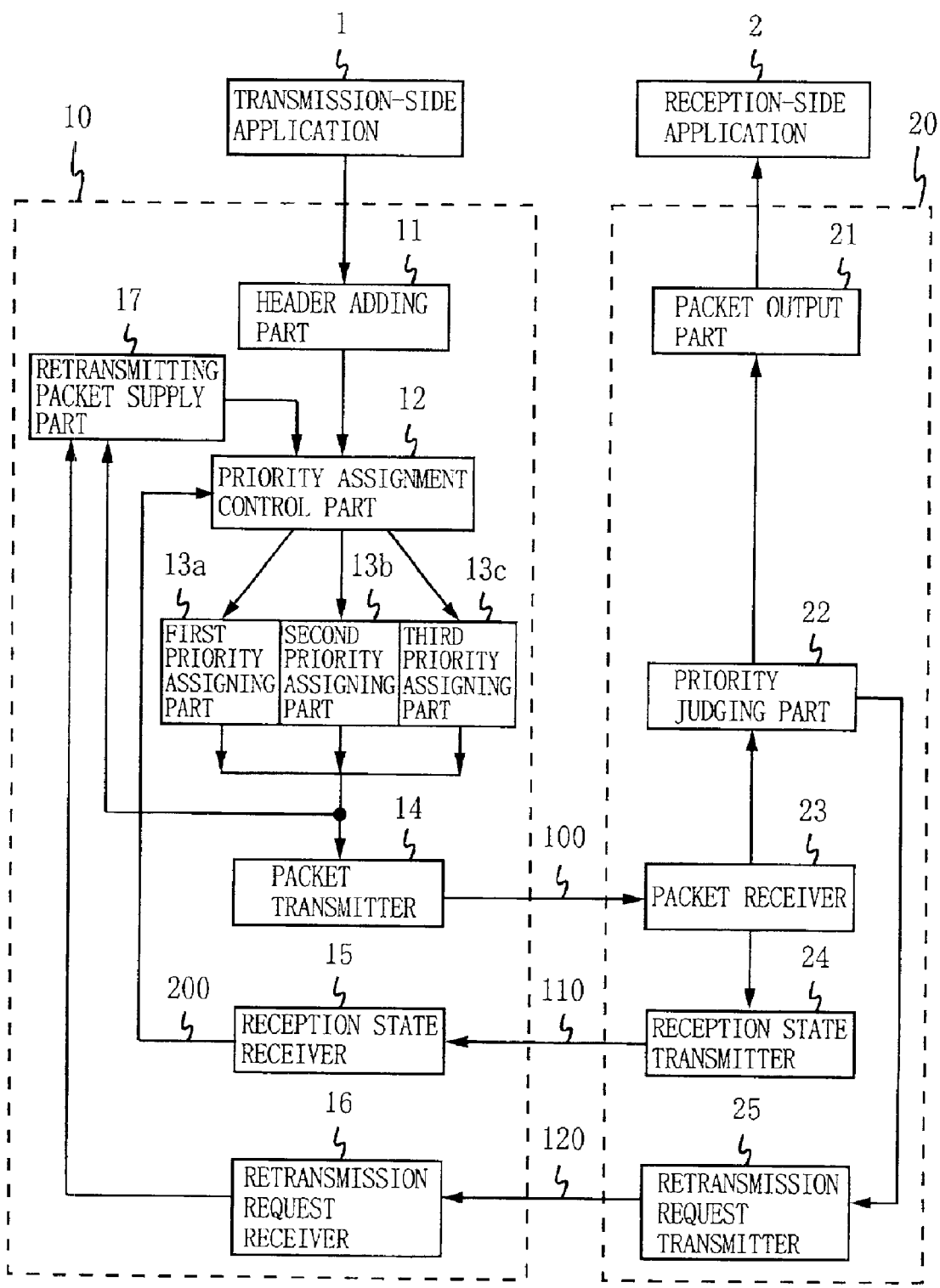
FIG. 1 is a block diagram showing the configuration of a data transmission apparatus according to an embodiment of the present invention.
Figures 8, 9:
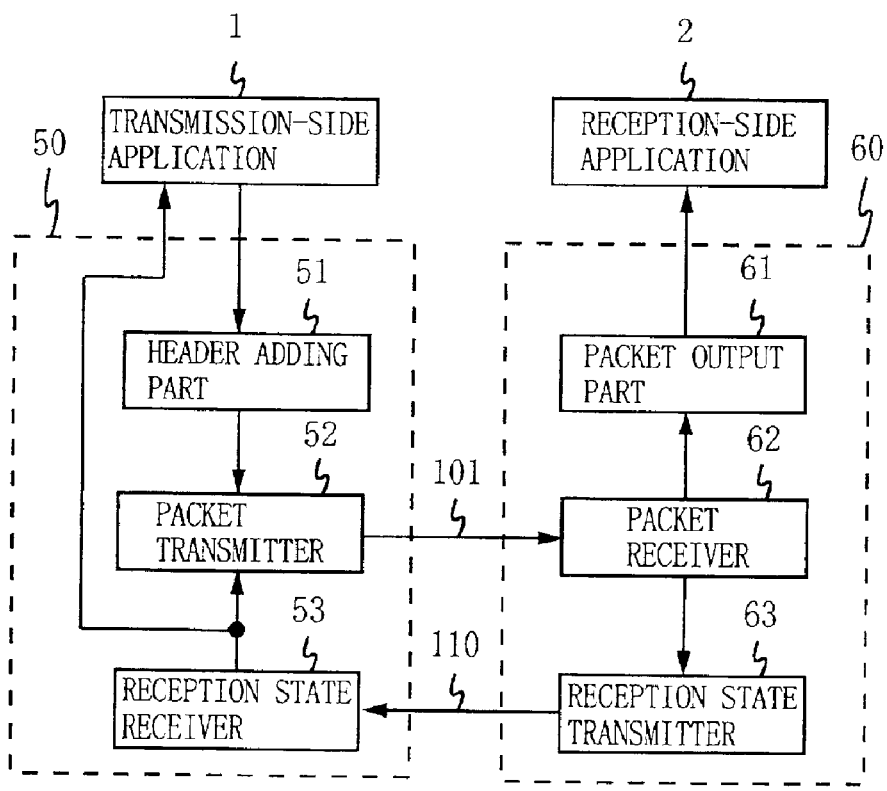
FIG. 8 is a table showing manners of priority assignment differed between priority-assigning parts in the data transmission apparatus of the embodiment.
FIG. 9 is a block diagram showing the configuration of a conventional data transmission apparatus having an RTP applied.
Figure 10:
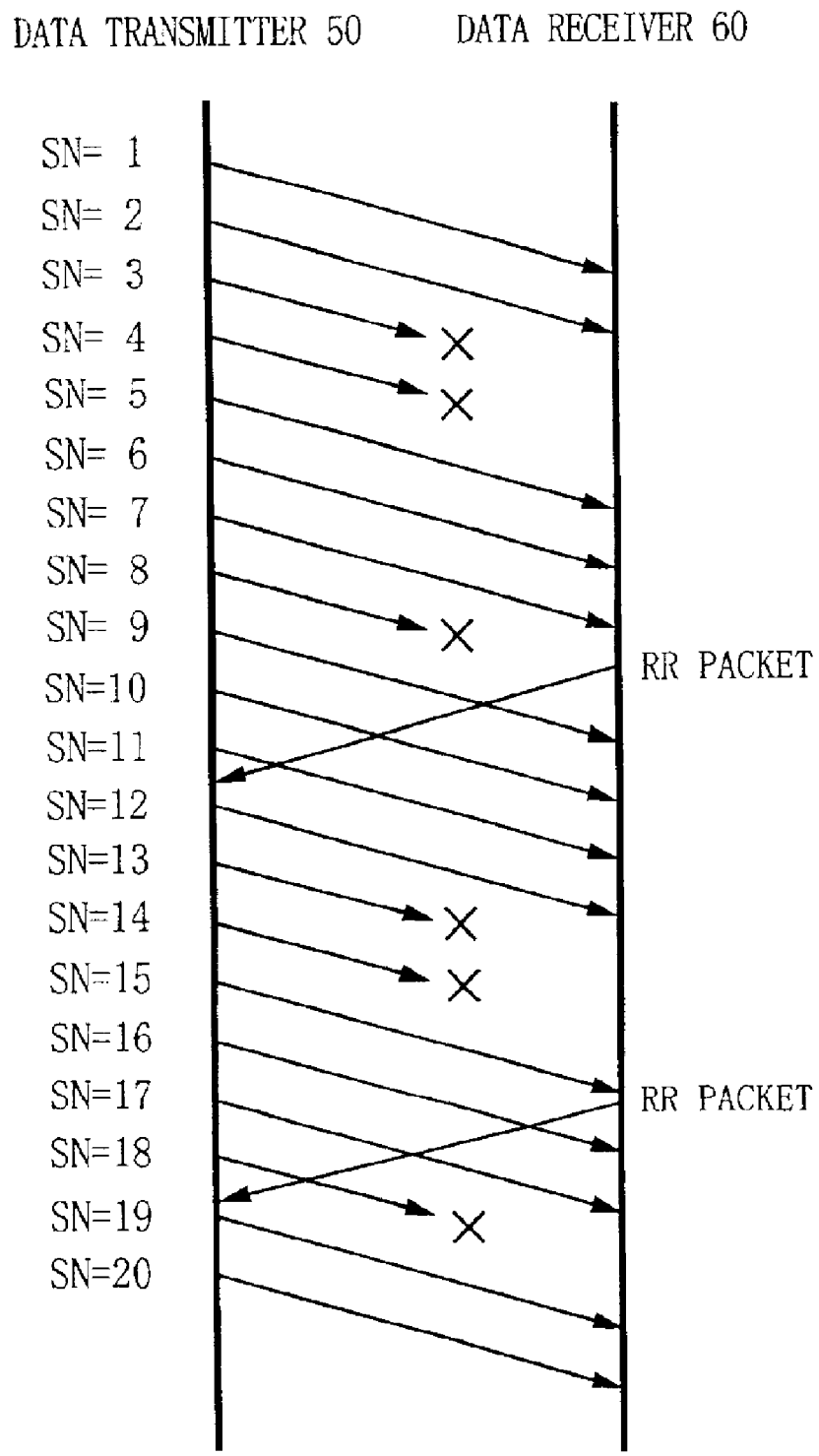
FIG. 10 is a sequence diagram for data transmission under the RTP.
Figure 11:
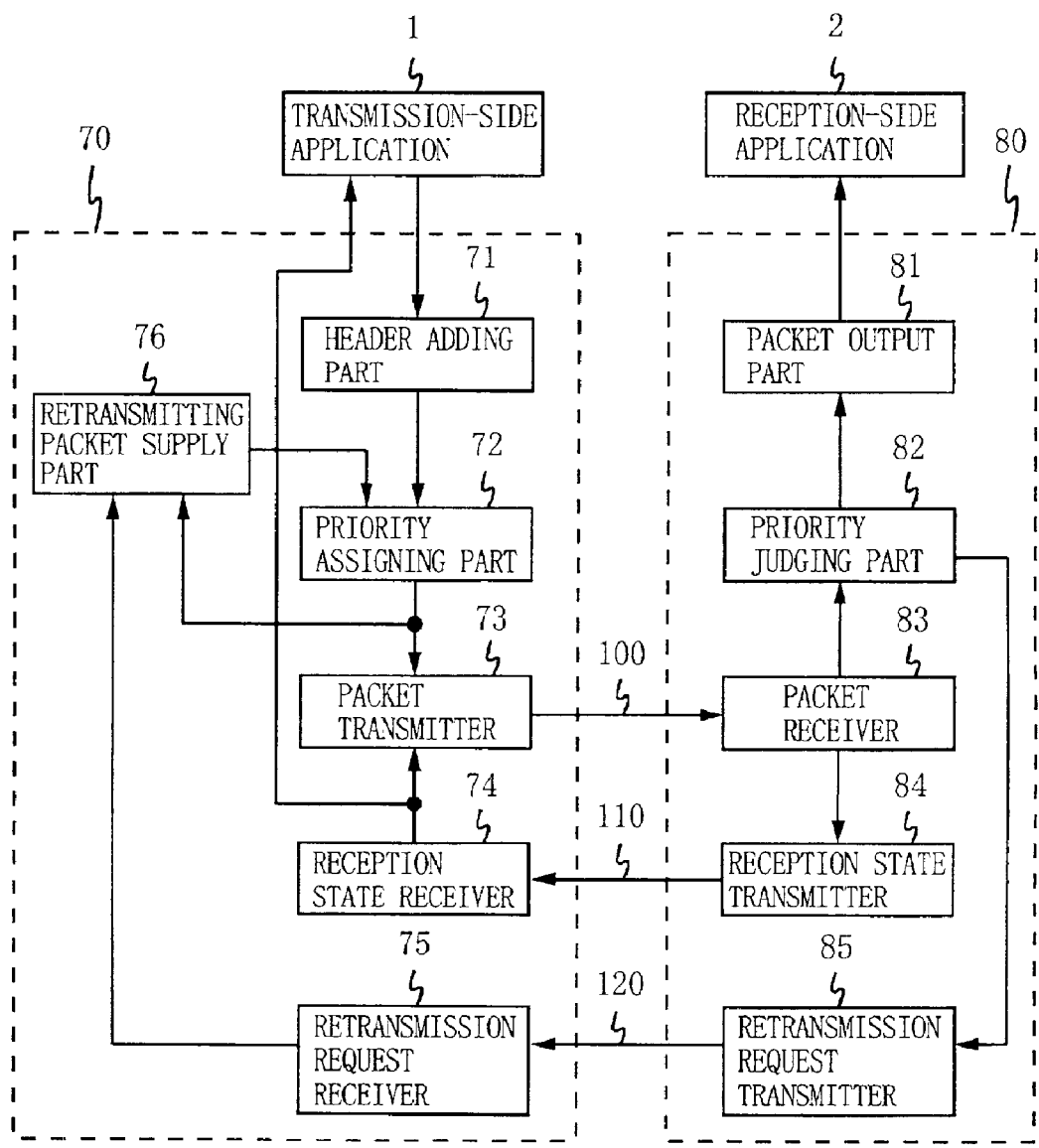
FIG. 11 is a block diagram showing the configuration of the conventional data transmission apparatus under the priority-assigned RTP.
Figure 12:
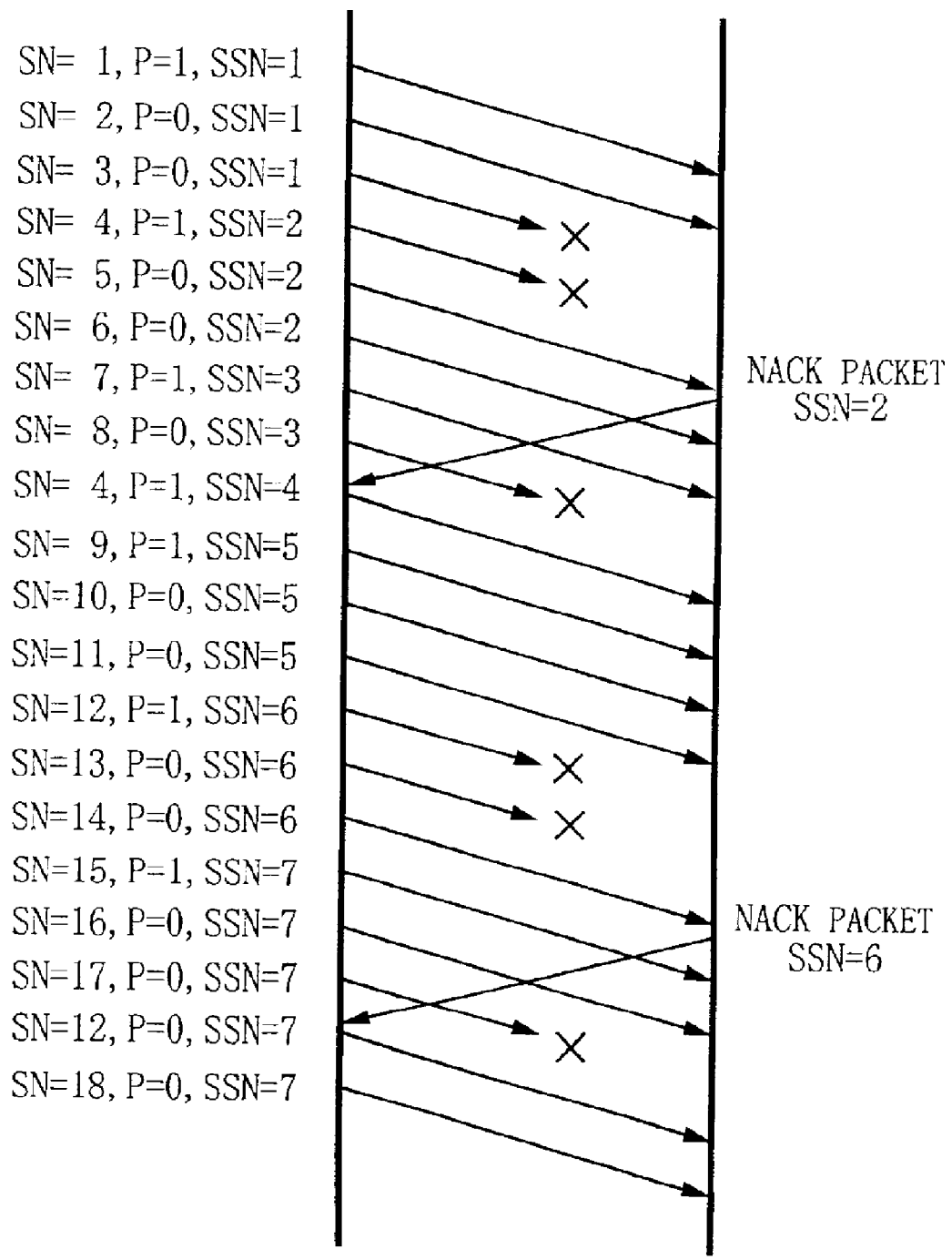
FIG. 12 is a sequence diagram for data transmission under the priority-assigned RTP.

FIG. 1 is a block diagram showing the configuration of a data transmission apparatus according to an embodiment of the present invention. This data transmission apparatus is configured by a data transmitter 10 and a data receiver 20, and data is transmitted from the transmission-side application 1 to the reception-side application 2 under the priority-assigned RTP. The data transmitter 10 includes a header adding part 11, a priority assignment control part 12, first to third priority assigning parts 13a to 13c, a packet transmitter 14, a reception state receiver 15, a retransmission request receiver 16, and a retransmitting packet supply part 17. As to the data receiver 20, included are a packet output part 21, a priority judging part 22, a packet receiver 23, a packet reception state transmitter 24, and a retransmission request transmitter 25. Herein, any component appeared in the apparatus of FIG. 9 is under the same reference numeral.

Described next is data transmission from the transmission-side application 1 to the reception-side application 2. First, the header adding part 11 provides a packet outputted from the transmission-side application 1 with a header including a sequence number and a timestamp, for example. The priority assignment control part 12 outputs the header-added packet to any of the first to third priority assigning part 13a to 13c. As will be later described, the first to third priority assigning parts 13a to 13c provide every incoming packet with a priority of high or low in each different manner. The packet transmitter 14 transmits the priority-assigned data packet 100 to the packet receiver 23.

The data packet 100 thus received by the packet receiver 23 is then forwarded to the packet output part 21 via the priority judging part 22. The packet output part 21 stores the data packet 100, and waits for the time designated by its timestamp for output to the reception-side application 2. The priority judging part 22 detects whether any packet of high priority has been lost, and the detection result is notified to the retransmission request transmitter 25. The retransmission request transmitter 25 transmits the NACK packet 120 designating which packet is to be retransmitted.

Based on the received NACK packet 120, the retransmission request receiver 16 informs the retransmitting packet supply part 17 which packet needs to be retransmitted. Here, the retransmitting packet supply part 17 previously stores any packet assigned with a high priority by the first to third priority assigning parts 13a to 13c, and responsively outputs the designated packet to the priority assignment control part 12.

The packet receiver 23 also outputs the data packet 100 to the reception state transmitter 24 after detecting any packet loss. Based on the information about packet loss, the reception state transmitter 24 generates the RR packet 110, and transmits it to the reception state receiver 15. From the RR packet 110, the reception state receiver 15 extracts a packet loss ratio 200, and outputs it to the priority assignment control part 12. Based on the packet loss ratio 200, the priority assignment control part 12 determines to which of the first to third priority assigning parts 13a to 13c the packets each provided by the header adding part 11 and the retransmitting packet supplying part 17 are to be outputted.

Next, the data transmission apparatus of the present embodiment is described in detail.

Here, the transmission-side application 1 is presumably an application for encoding moving pictures such as MPEG 4 and H. 263, for example. The transmission-side application 1 first performs intra-coding or inter-coding with respect to moving pictures, and the resultingly derived coded data is divided into packets. The packets are classified into "intra-coded packets" carrying intra-frame coded data, and "inter-coded packets" carrying inter-frame coded data. In comparison, the intra-coded packets exert more significant influence upon the quality of the resulting reproduced image than the inter-coded packets, and thus considered more consequential. Such packet characteristic is outputted from the transmission-side application 1 together with the packets.

In the present embodiment, presumably, the intra-coded packet corresponds to any intra-coded frame, and the inter-coded packet to any inter-coded frame. Alternatively, any packet carrying the predetermined number or more of intra-coded blocks may be handled as the intra-coded packet, or any packet carrying the intra-coded blocks with a predetermined ratio or more may be handled as such. In this case, any other packet may be handled as the inter-coded packet.

Figures 2, 3:
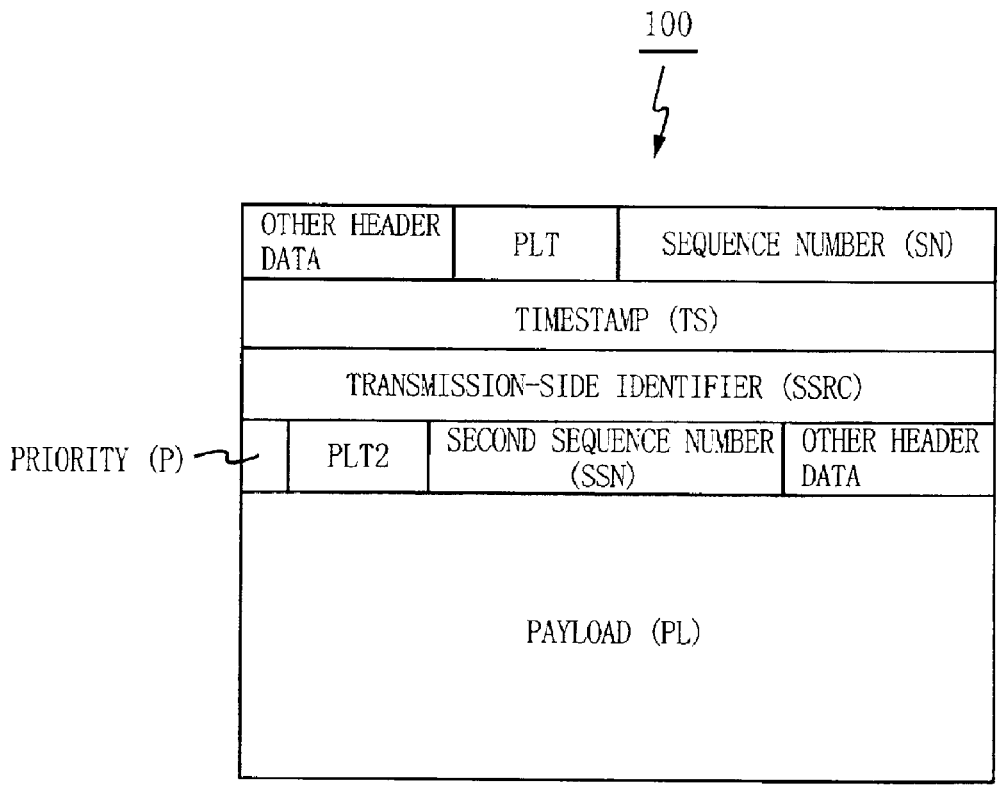
FIG. 2 is a diagram showing the format of a data packet under a priority-assigned RTP.
FIG. 3 is a table showing manners of priority assignment differed among priority-assigning parts in the data transmission apparatus of the embodiment.

FIG. 2 is a diagram showing the format of the priority-assigned data packet 100. In FIG. 2, a payload PL is packet data outputted from the transmission-side application 1. A payload type PLT denotes the priority-assigned RTP as being applied for data transmission. A sequence number SN is a number sequentially incremented by 1 in order of data packets. A timestamp TS denotes a time when the packet is to be used in the reception-side application 2. A transmission-side identifier SSRC identifies the data transmitter 10. A priority P denotes the packet priority, and a value 1 means the packet as being high in priority, and a value 0 as being low in priority. A second payload type PLT2 denotes the type of data to be transmitted under the priority-assigned RTP. A second sequence number SSN is a number incremented by 1 whenever the subsequent packet is of high priority, but remains the same for the packet low in priority.

The header adding part 11 provides the packet outputted from the transmission-side application 1 with a header, and sets a value to fields from the head of the header to the transmission-side identifier. The header-added packet is outputted by the priority assignment control part 12 to any of the first to third priority assigning parts 13a to 13c.

As shown in FIG. 3, the first to third priority assigning parts 13a to 13c perform priority assignment in each different manner. In detail, in the first priority assigning part 13a, the priority assigned to the intra-coded packets is either high or low with a ratio of 1:1, and the priority to the inter-coded packets is low. In the second priority assigning part 13b, the priority assigned to the intra-coded packets is high, but to the inter-coded packets is low. The third priority-assigning part 13c assigns every incoming packet with a low priority. Based on the priorities assigned as such, the first to third priority assigning parts 13a to 13c assign each packet with the second sequence number.

The packet transmitter 14 transmits the priority-assigned data packets 100 provided by the first to third priority assigning parts 13a to 13c. The data packets 100 are transmitted over the Internet using the User Datagram Protocol (UDP) module (not shown), for example.

In response to the data packets 100, the packet output part 21 and the packet receiver 23 operate as described above. The priority judging part 22 refers to the priorities and the second sequence numbers to detect whether any packet of high priority has been lost, and notifies the detection result to the retransmission request transmitter 25. Specifically, if detecting any packet of high priority having the second sequence number larger by 2 or more than that of the preceding packet, or if detecting any packet of low priority having the second sequence number different from that of the preceding packet, the priority judging part 22 determines that any packet of high priority has been lost.

The retransmission request transmitter 25 generates, based on the notification from the priority judging part 22, the NACK packet 120 designating which packet needs to be retransmitted. FIG. 4 is a diagram showing the format of the NACK packet. In FIG. 4, a packet type (PT) denotes the type of packet. A packet length (L) denotes the length of the packet. A reception-side identifier (SSRC_R) is an identifier for identifying the data receiver 20. The transmission-side identifier SSRC identifies from where the data packet 100 came, that is, the data transmitter 10. The second sequence number (SSN) is the second sequence number of the packet to be retransmitted. Here, the NACK packet shown in FIG. 4 is designating only one packet for retransmission. The number of the packets to be designated is not restrictive, and several packets may be simultaneously designated by including any appropriate field for other data.

The retransmission request transmitter 25 transmits thus generated NACK packet 120 over the Internet using the UDP module (not shown), for example, as is the data packet 100.

In response to the NACK packet 120, the retransmission request receiver 16 and the retransmitting packet supply part 17 operate as described above. The first to third priority assigning parts 13a to 13c, and the packet transmitter 14 execute the processing to the packet provided by the retransmitting packet supply part 17 in the same manner as to the packet coming from the header adding part 11. Accordingly, any packet of high priority designated by the NACK packet 120 is retransmitted.

The packet receiver 23 detects any packet loss by referring to the sequence numbers of the received data packets 100. If detecting any packet of high priority having the sequence number larger by 2 or more than that of the preceding packet, the packet receiver 23 determines as packet loss having been occurred. The packet receiver 23 notifies information about packet reception state and packet loss to the reception state transmitter 24.

Based on the notified information, the reception state transmitter 24 calculates the total number of packets lost so far and the packet loss ratio, and generates the RR packet 110 including thus calculated values. FIG. 5 is a diagram showing the format of the RR packet 110. Therein, the packet type (PT), the packet length (L), the reception-side identifier (SSRC_R), and the transmission-side identifier (SSRC) are the same as those in the format of the NACK packet 120. Here, a cumulative number of packets lost (CNPL) and a fraction lost (FL: equal to packet loss ratio) indicate the values calculated by the reception state transmitter 24. An extended highest sequence number received (EHSNR) denotes the sequence number of the packet last received. An interarrival jitter (IJ) denotes a jitter observed for the delay over the transmission path, and a last SR (LSR) and a delay since last SR (DLSR) are used to measure the round-trip delay over the transmission path. Here, the details of each field are also found in the above document (RFC1889).

The reception state transmitter 24 transmits thus generated RR packet 110 over the Internet by using the UDP module (not shown), for example, as is the data packet 100. The reception state receiver 15 extracts the packet loss ratio 200 from the RR packet 110, and outputs it to the priority assignment control part 12.

Based on the packet loss ratio 200, the priority assignment control part 12 changes to which of the first to third priority assigning parts 13a to 13c the packets provided by the header adding part 11 and the retransmitting packet supply part 17 are to be outputted. Here, assuming that the packet loss ratio 200 is X (%), and threshold values for the change are T1 and T2. When X is T1 or larger, the priority assignment control part 12 outputs the received packet to the first priority assigning part 13a. When X is T2 or lager and smaller than T1, the received packet goes to the second priority assigning part 13b, and when X is smaller than T2, to the third priority assigning part 13c. As an example, when T1 is 70% and T2 is 30%, the priority assignment control part 12 outputs the received packet to the first priority assigning part 13a with X being 70% or more, to the second priority assigning part 13b with X being 30% or larger and smaller than 70%, and to the third priority assigning part 13c with X being smaller than 30%. As such, the manners of priority assignment are changed based on the packet loss ratio.

Figure 6:
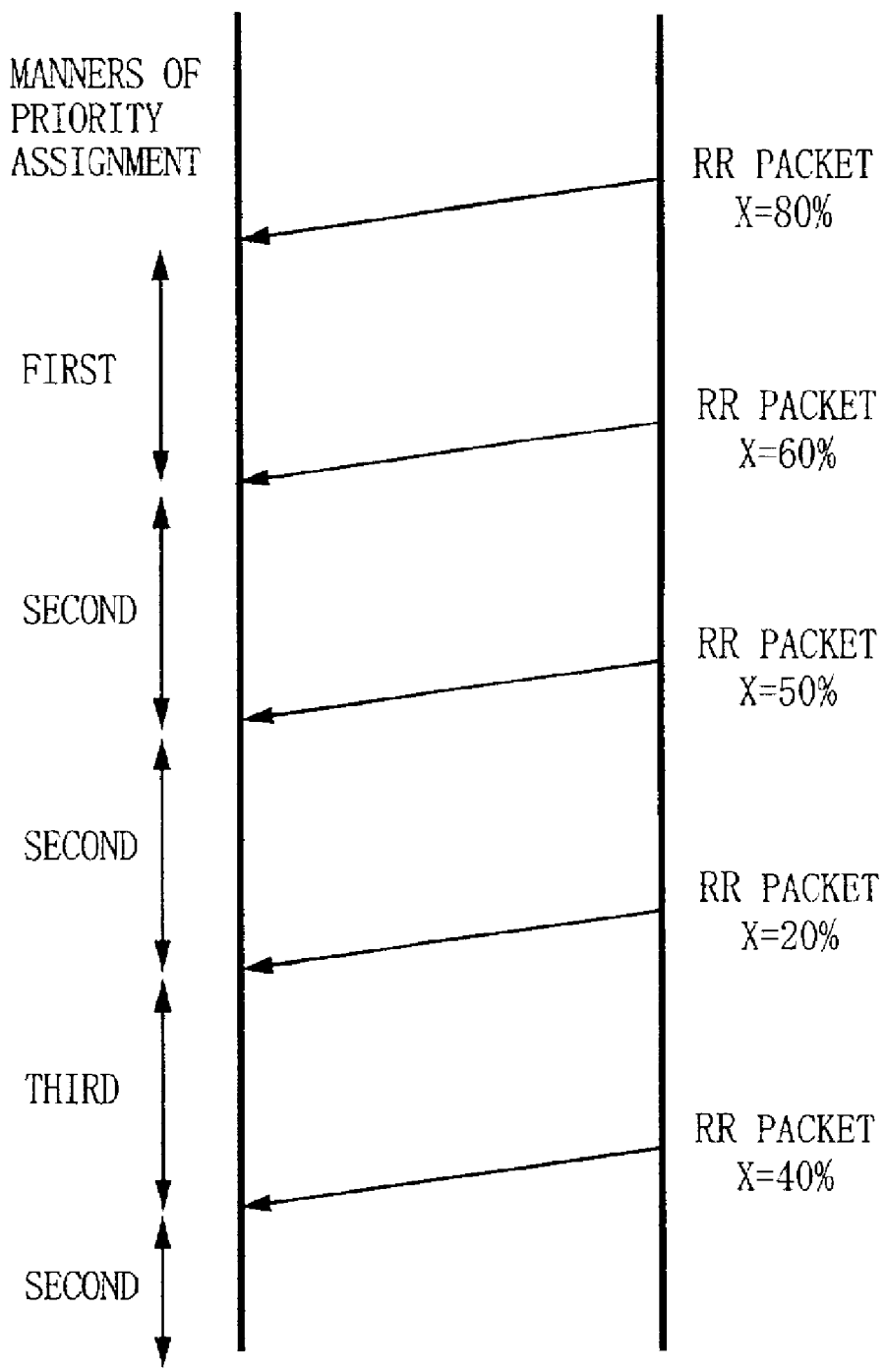
FIG. 6 is a diagram showing the manner change of priority assignment in the data transmission apparatus of the embodiment.

FIG. 6 is a diagram showing the manner change of priority assignment done by the data transmitter 10 after receiving the RR packet 110. For the sake of simplification, FIG. 6 shows only the RR packet 110. The data receiver 20 transmits, with a predetermined timing, the RR packet 110 carrying the packet loss ratio. In response to the packet loss ratio, the data transmitter 10 changes the manners of priority assignment. Specifically, the manners are so changed that the number of packets high in priority becomes less with the high packet loss ratio, and with the low packet loss ratio, the number of packets high in priority are increased. Accordingly, packet retransmission is suppressed with the high packet loss ratio, whereby the data to be transmitted is reduced. On the other hand, packet retransmission is encouraged with the low packet loss ratio, whereby the data to be transmitted is increased. As such, by changing the manners of priority assignment and controlling data amount for retransmission, coded data derived from moving pictures can be efficiently transmitted with whatever available data capacity, preventing quality deterioration to any resulting reproduced image.

As such, in the data transmission apparatus of the present embodiment, the manners of priority assignment are changed on the transmission side in consideration of the packet reception state, and thus the packets of high quality are increased in number when the packet reception state is bad, and decreased in number with good packet reception state. In this manner, the data to be retransmitted can be controlled in amount, and thus data transmission can be efficiently performed with whatever available data capacity.

Here, the first to third priority assigning parts 13a to 13c are provided in the data transmission apparatus, and priority assignment is changed in three different manners. This is not restrictive, and as shown in FIG. 7, for example, the data transmission apparatus may include first and second priority assigning parts 33a and 33b, and these may operate according to a table shown in FIG. 8.

Further, the packet characteristic is outputted from the transmission-side application in the above. However, the data transmitter may calculate that. For example, to transmit image coded data under the RTP, the packet characteristic may be easily derived by referring to a specific bit in the packet.

Still further, data to be transmitted is arbitrary, and so is the manner of packet classification. For example, to transmit data derived by hierarchically coding the image in the frequency direction, the same manner as above can be applied by classifying any packet including a low frequency component into the intra-coded packet, or any packet including a high frequency component into the inter-coded packet. Also for transmission of audio data, any packet carrying real sound may be classified into the intra-coded packet, or any packet carrying silent sound for most of the part into the inter-coded packet. As another possibility, priority assignment may be done without referring to the packet characteristic.

In the present embodiment, the communications protocol is the RTP. This is not restrictive, and any other communications protocol will also do, leading to the data transmission apparatus with the same features as above.

While the invention has been described in detail, the foregoing description is in all aspects illustrative and not restrictive. It is understood that numerous other modifications and variations can be devised without departing from the scope of the invention.

What is claimed is:

1. A data transmission apparatus for transmitting data packets, said transmission apparatus comprising:
   a transmitter operable to transmit the data packets, said transmitter comprising a priority assignment part, a packet transmitter, a reception state receiver and a packet retransmitter; and
   a receiver operable to receive the data packets, said receiver comprising a packet receiver, a reception state transmitter and a retransmission request transmitter,
   wherein said priority assignment part is operable to assign priorities to the data packets,
   wherein said packet transmitter is operable to transmit a priority-assigned packet,
   wherein said reception state receiver is operable to receive information related to a packet reception state of said receiver,
   wherein said packet retransmitter is operable to perform packet retransmission in response to a retransmission request from said receiver,
   wherein said packet receiver is operable to receive the priority-assigned packet provided by said packet transmitter and to detect packet loss information,
   wherein said reception state transmitter is operable to transmit the information related to the packet reception state, which is based on the packet loss information detected by said packet receiver,
   wherein said retransmission request transmitter is operable to transmit the retransmission request if any packet of high priority is detected as having been lost, and
   wherein said priority assignment part is further operable to change a manner of assigning priorities to the data packets so that a number of times a high priority is assigned is decreased when the packet reception state does not meet a parameter, and the number of times the high priority is assigned is increased when the packet reception state meets the parameter.

2. The data transmission apparatus according to claim 1, wherein
   said reception state transmitter is operable to transmit the information related to the packet reception state including information related to a packet loss ratio of packets lost at said packet receiver, and
   said priority assignment part is operable to change the manner of assigning priorities to the data packets so that the high priority is assigned to a lower ratio of packets when the information related to the packet loss ratio indicates that the packet loss ratio is larger than a predetermined value, and so that the high priority is assigned to a higher ratio of packets when the information related to the packet loss ratio indicates that the packet loss ratio is smaller than the predetermined value.

3. The data transmission apparatus according to claim 1, wherein said priority assignment part is further operable to
   classify any packet including coded data derived from moving pictures into an intra-coded packet carrying intra-frame coded data, or an inter-coded packet carrying inter-frame coded data, and
   based on the information related to the packet reception state, change the manner of assigning priorities to the data packets according to packet type.

4. The data transmission apparatus according to claim 3, wherein based on the information related to the reception state, said priority assignment part is further operable to change between
   a first priority assigning manner wherein intra-coded packets are assigned with a high priority, and inter-coded packets are assigned with a low priority, and
   a second priority assigning manner wherein every packet is assigned with a high priority.

5. The data transmission apparatus according to claim 3, wherein based on the information related to the reception state, said priority assignment part is further operable to change among a first priority assigning manner wherein intra-coded packets are assigned with either a high or low priority at a predetermined ratio, and inter-coded packets are assigned with a low priority, a second priority assigning manner wherein the intra-coded packets are assigned with a high priority, and the inter-coded packets are assigned with a low priority, and a third priority assigning manner wherein every packet is assigned with a high priority.

6. A data transmission method for transmitting data packets from a transmitter to a receiver, said transmission method comprising:

assigning, at the transmitter, priorities to the data packets;

transmitting, from the transmitter, a priority-assigned packet;

receiving, at the transmitter, information related to a packet reception state of the receiver;

performing packet retransmission, at the transmitter, in response to a retransmission request from the receiver;

receiving, at the receiver, the priority-assigned packet and detecting packet loss information;

transmitting, from the receiver, the information related to the reception state of the receiver based on the packet loss information;

transmitting, from the receiver, the retransmission request if any packet of high priority is detected as having been lost, wherein said assigning priorities comprises changing a manner of assigning priorities to the data packets so that a number of times a high priority is assigned is decreased when the packet reception state does not meet a parameter, and the number of times the high priority is assigned is increased when the packet reception state meets the parameter.

7. The data transmission method according to claim 6, wherein in said transmitting of the information from the receiver, the information related to the reception state includes information related to a packet loss ratio of packets lost at the receiver, and in said assigning of priorities at the transmitter, the manner of assigning priorities to the data packets is so changed that the high priority is assigned to a lower ratio of packets when the information related to the packet loss ratio indicates that the packet loss ratio is larger than a predetermined value, and that the high priority is assigned to a higher ratio of packets when the information related to the packet loss ratio indicates that the packet loss ratio is smaller than the predetermined ratio.

8. The data transmission method according to claim 6, wherein in said assigning of priorities at the transmitter, any packet including coded data derived from moving pictures is classified into an intra-coded packet carrying intra-frame coded data, or an inter-coded packet carrying inter-frame coded data, and based on the information related to the packet reception state, the manner of assigning priorities to the data packets according to packet type are changed.

9. The data transmission method according to claim 8, wherein the manner of assigning priorities to the data packets is changed between a first priority assigning manner wherein intra-coded packets are assigned with a high priority, and inter-coded packets are assigned with a low priority, and a second priority assigning manner wherein every packet is assigned with a high priority.

10. The data transmission method according to claim 8, the manner of assigning priorities to the data packets is changed among a first priority assigning manner wherein intra-coded packets are assigned with either a high or low priority at a predetermined ratio, and inter-coded packets are assigned with a low priority, a second priority assigning manner wherein intra-coded packets are assigned with a high priority, and said inter-coded packets are assigned with a low priority, and a third priority assigning manner wherein every packet is assigned with a high priority.

11. A data transmission apparatus for transmitting data to a reception apparatus on a packet basis, the data transmission apparatus comprising:

priority assignment part operable to assign, on a packet basis, priorities to every packet;

packet transmitter operable to transmit a priority-assigned packet;

reception state receiver operable to receive a packet reception state including a packet loss ratio in the reception apparatus; and packet retransmitter operable to perform retransmission of the priority-assigned packet in response to a retransmission request from the reception apparatus, wherein the priority assignment part changes a manner of priority assignment such that a number of packets that are high in priority is decreased when the packet loss ratio is larger than a predetermined value and is increased when the packet loss ratio is smaller than the predetermined value.

12. The data transmission apparatus according to claim 11, wherein the priority assignment part classifies any packet including coded data derived from moving pictures as a packet type pertaining to intra-coded packets carrying intra-frame coded data, or a packet type pertaining to inter-coded packets carrying inter-frame coded data, and priority assignment part changes, based on the reception state, a manner of priority assignment determined for each packet type.

13. The data transmission apparatus according to claim 12, wherein the priority assignment part changes, based on the reception state, the manner of priority assignment between a first priority assigning manner of assigning a high priority to the intra-coded packets, and a low priority to the inter-coded packets, and a second priority assigning manner of assigning a high priority to any pocket.

14. The data transmission apparatus according to claim 12, wherein the priority assignment part changes, based on the reception state, the manner of priority assignment between a first priority assigning manner of assigning a high priority to the intra-coded packets, and a low priority to the inter-coded packets, a second priority assigning manner of assigning a high priority to the intra-coded packets, and a low priority to the inter-coded packets, and a third priority assigning manner of assigning a high priority to any packet.

15. A data transmission method for transmitting data to a reception apparatus on a packet basis, the method comprising:

assigning, on a packet basis, priorities to every packet;

transmitting a priority-assigned packet;

receiving a packet reception state including a packet loss ratio in the reception apparatus; and performing retransmission of the priority-assigned packet in response to a retransmission request from the reception apparatus, wherein assigning priorities changes a manner of priority assignment such that a number of packets that are high in priority is decreased when the packet loss ratio is larger than a predetermined value and is increased when the packet loss ratio is smaller than the predetermined value.

16. The data transmission method according to claim 15, wherein assigning priorities classifies any packet including coded data derived from moving pictures as a packet type pertaining to intra-coded packets carrying intra-frame coded data, or a packet type pertaining to inter-coded packets carrying inter-frame coded data, and assigning priorities changes, based on the reception state, a manner of priority assignment determined for each packet type.

17. The data transmission method according to claim 16, wherein assigning priorities changes, based on the reception state, the manner of priority assignment between a first priority assigning manner of assigning a high priority to the intra-coded packets, and a low priority to the inter-coded packets, and a second priority assigning manner of assigning a high priority to any packet.

18. The data transmission method according to claim 16, wherein assigning priorities changes, based on the reception state, the manner of priority assignment between a first priority assigning manner of assigning a high priority to a part of the intra-coded packets, and a low priority to remaining packets, a second priority assigning manner of assigning a high priority to the intra-coded packets, and a low priority to the inter-coded packets, and a third priority assigning manner of assigning a high priority to any packet.

19. A data transmission method for transmitting data to a reception apparatus on a packet basis, the method comprising:

assigning, on a packet basis, priorities to every packet;

providing an instruction to transmit a priority-assigned packet;

receiving and acquiring a packet reception state including a packet loss ratio in the reception apparatus; and providing an instruction to perform retransmission of the priority-assigned packet in response to a retransmission request from the reception apparatus, wherein assigning priorities changes a manner of priority assignment such that a number of packets that are high in priority is decreased when the packet loss ratio is larger than a predetermined value and is increased when the packet loss ratio is smaller than the predetermined value.

* * * * *

UNITED STATES PATENT AND TRADEMARK OFFICE
CERTIFICATE OF CORRECTION

PATENT NO. : 6,987,730 B2  
APPLICATION NO. : 09/929487  
DATED : January 17, 2006  
INVENTOR(S) : Koichi Hata et al.

Page 1 of 1

It is certified that error appears in the above-identified patent and that said Letters Patent is hereby corrected as shown below:

In Column 12, Claim 12, line 43, before "priority" insert --the--.

In Column 12, Claim 14, line 60, after "priority" insert --a part of--;

In Column 12, Claim 14, line 61, change "the inter-coded packets" to --remaining packets--.

Signed and Sealed this

Fifth Day of September, 2006

JON W. DUDAS  
*Director of the United States Patent and Trademark Office*